United States Patent [19]

Fischer

[11] Patent Number: 5,795,515
[45] Date of Patent: Aug. 18, 1998

[54] METHOD OF PRODUCING FORMED ARTICLES OF A FIBER REINFORCED, HYDRAULICALLY SETTING MATERIAL

[75] Inventor: Hans Fischer, Uznach, Switzerland

[73] Assignee: Nueva AG, Weesen, Switzerland

[21] Appl. No.: 676,482

[22] Filed: Jul. 8, 1996

[30] Foreign Application Priority Data

Aug. 16, 1995 [CH] Switzerland .............. 2348/95

[51] Int. Cl.$^6$ .................................................. C04B 40/02
[52] U.S. Cl. ..................... 264/82; 264/333; 162/123; 162/145; 162/181.3; 162/181.6
[58] Field of Search ............. 264/82, 333; 162/145, 162/181.3, 181.6, 156, 157.2, 157.6, 123

[56] References Cited

U.S. PATENT DOCUMENTS

| | | | |
|---|---|---|---|
| 4,637,860 | 1/1987 | Harper | 264/333 |
| 4,746,481 | 5/1988 | Schmidt | 264/82 |
| 4,797,161 | 1/1989 | Kirchmayr et al. | 264/333 |
| 5,076,986 | 12/1991 | Delvaux et al. | 264/333 |
| 5,188,889 | 2/1993 | Nagatomi et al. | 264/51 |

FOREIGN PATENT DOCUMENTS

| | | | |
|---|---|---|---|
| 584666 | 2/1977 | Switzerland | 264/82 |

*Primary Examiner*—James Derrington
*Attorney, Agent, or Firm*—Laurence R. Brown

[57] ABSTRACT

At the method of producing formed articles of a fiber reinforced, hydraulically setting material the organic fibers are mineralized by aluminum sulfate and silica, the mixture processed with excess water to multilayered products, the laminates arrived therewith are then set in two steps and finally the formed articles produced treated by $CO_2$ for a pre-carbonization.

13 Claims, No Drawings

METHOD OF PRODUCING FORMED ARTICLES OF A FIBER REINFORCED, HYDRAULICALLY SETTING MATERIAL

BACKGROUND OF THE INVENTION

1. Field of the Invention

The present invention relates to a method of producing formed articles of a fiber reinforced, hydraulically setting material in the Hatschek or flow-on method, whereby hydraulic binding agents, organic reinforcing fibers and process fibers and possibly filler materials are mixed with water in an amount of 250–500% water based on the dry weight of the constituents.

2. Description of the Prior Art

Formed articles, specifically building parts such as e.g. plates or slabs, resp. consisting of a cement matrix with integrated reinforcement fibers, e.g. wood or cellulose are widely known.

The corresponding products are generally produced on the basis of wood and cement and contain a high portion of wood, namely 25–40% (per weight). The wood fibers used are, thereby, relatively coarse (chippings). In case of products having several layers, the inner layers contain coarser fibers than the outer layers. The necessary compressing of the products is thereby relatively time consuming. Thin slabs have thereby the drawback of a low rigidity.

Slabs or plates for building constructions consisting of a mixture of wood chippings and cement and, furthermore, of chemical additives are known. In order to increase the bending strength glass fibers, cellulose fibers, synthetic fibers and mineral wool fibers are employed in addition to wood fibers. During production attention must be paid to the correct orientation of the fibers.

It has, however, become obvious that until today it has been practically impossible to produce plates or slabs having merely a reinforcement of wood fibers which have a sufficient bending strength.

Conventional formed articles with reinforcing fibers of wood or other organic materials are not suitable to an exposure to weather influences if the fibers are not mineralized.

SUMMARY OF THE INVENTION

Thus, it is a general object of the present invention to provide a as simple as possible method of producing formed articles, of which the organic reinforcing fibers can be mineralised in a most simple way in order to give the product the desired rigidity patenlability specific environmental weather conditions.

A further object is to provide a method of producing formed articles comprising the steps of admixing aluminum sulfate for mineralizing the organic fibers, of thereafter processing the mixture on a Hatschek or flow-on-plant to multilayered parts, of presetting the damp laminates in molds in an environment of a high relative humidity and temperature, of removing the laminates from the mold and subjecting them during a plurality of days to an actual setting, of thereafter subjecting the formed parts at temperatures between 45° and 125° and a humid environment to a treatment by $CO_2$, in order to modify the matrix once more and to precarbonize the product.

The addition of the aluminum sulfate leads to a change of the electrokinetic potential (Zeta-potential) of the fibers which makes the subsequent mineralizing of the organic fibers by the addition of the preferably amorphous silica (small amounts suffice) possible. Therefore, in order to obtain a formed article of a high rigidity, cement, possible filler materials, coarse mineralized reinforcing fibers and fine process fibers are sufficient.

By the addition of $CO_2$ (injection, blowing in), the matrix is modified or the product precarbonized, resp., which has specifically a positive influence on the long term behavior under detrimental weather conditions. The rigidity, specifically the bending strength, is achieved by the mineralisation of the organic reinforcing fibers.

DESCRIPTION OF A PREFERRED EMBODIMENT

The present invention will be better understood and objects other than those set forth come in mind when reading the following description of a preferred embodiment thereof.

The length of the fibers amount to 0.2–6 millimeters, preferably 0.3–4 millimeters.

For the producing of a formed article in accordance with the invention for instance following mixture is used:

| | |
|---|---|
| Binding agent (cement) | 60–85% |
| Filler materials | 5–30% |
| Organic and mineralized process fibers | 1–5% |
| Organic and mineralized reinforcement fibers | 4–10% |

Each formed article (plate or slab, resp.) can comprise due to the treatment of the mixture according to the Hatschek or flow-on process 5 to 50 layers of different thickness. The formed articles, specifically building materials can find application as claddings, partitions, roof coverings and walls.

Products produced in accordance with the invention display following features:

| | |
|---|---|
| Strength after 28 days | 9–15 N/mm² |
| Strength after 1 year | 11–17 N/mm² |
| Breaking energy after 28 days | 1–4 KJ/m² |
| Breaking energy after 1 year | 2–5 KJ/m² |
| Tested specimen (after 28 days): | |
| Strength | 10.8 N/mm² |
| Density | 1.09 kg/dm³ |
| Breaking energy | 1.14 KJ/m² |
| Modulus of elasticity | 3.54 kN/mm² |
| Grade of carbonization | 45% |
| Typical embodiments | |
| 1. Composition of the mixture | |
|    Binding agent (cement) | 70–80% |
|    Filler materials (e.g. calcite) | 8–25% |
|    Mineralized process fibers | 1–14% |
|    Mineralized reinforcing fibers | 6–10% |
| 2. Mineralisation of organic fibers | |
|    Pretreatment by aluminum sulfate | 3–25% |
|    subsequent mineralisation by amorphous silica | 4–30% |
|    (based on the dry weight of the fibers) | |

3. Pre-setting 9–18 hours at temperatures of 45°–105° C. and a relative humidity between 75–95%.

4. Actual drying (Heat treatment) t=50°–110° C. $CO_2$= 5–12% (leads to a pre-carbonization of 30–80%).

While there is described a present preferred embodiment, it shall be distinctly be understood that the invention is not limited thereto but can be variously practiced and embodied within the scope of the following claims.

I claim:

1. A method of producing formed articles of a fiber reinforced hydraulically setting material in a Hatschek process whereby hydraulic binding agents and organic reinforcing fibers as constituents are mixed with water in an amount of 250–500% based on the dry weight of the constituents, comprising the steps of admixing aluminum sulfate and silica for mineralizing the organic reinforcing fibers, thereafter processing said constituents with admixed aluminum sulfate and silica in the Hatschek process to obtain multilayered parts with damp laminates, presetting the damp laminates in molds in an environment of a high relative humidity and temperature, removing the laminates from the mold and letting them set for a plurality of days, and thereafter subjecting the laminates to temperatures between 45° and 125° C. in a humid environment to a treatment by $CO_2$ thereby precarbonizing the laminates.

2. The method of claim 1, comprising further the step of adding aluminum sulfate in an amount of 3–25% and silica in an amount of 4–30%, each based on the dry weight of the fibers.

3. The method of claim 1, wherein the presetting proceeds during 6 to maximal 20 hours at at least 40 to maximal 110° C. and a relative humidity in the range between 60–97%.

4. The method of claim 1, wherein the admixing step further comprises stabilizing the laminates at temperatures between 45° and 125° C.

5. The method of claim 1, wherein $CO_2$ is added in an amount of 4–15% of volume which leads to a precarbonization of 25–85%.

6. The method of claim 1, wherein the organic reinforcement fibers consist of cellulose and have a length of 0.2–6 millimeters, preferably 0.3–4 millimeters.

7. The method of claim 1, further comprising addition of filler materials selected from the group consisting of limestone powder, ashes or blast furnace slag.

8. The method of claim 7, wherein the following constituents by weight are used:

| | |
|---|---|
| Binding agents (cement) | 60–85% |
| Filler [Filler] materials | 5–30% and |
| [Organic and mineralized process fibers | 1–5%] |
| Organic and mineralized reinforcing fibers [reinforcement] | 4–10% |

9. The method of claim 1, wherein formed articles having 5 to 50 layers are produced.

10. The method of claim 9 including the step of producing said layers of various thicknesses.

11. The method of claim 1 wherein filler materials are mixed with the constituents.

12. The method of claim 1 further comprising the step of adding fibers selected from the group consisting of glass fibers, synthetic fibers and mineral wool fibers.

13. The method of claim 12 further comprising adding the fibers in a percentage of 1 to 5% by weight.

* * * * *